(12) United States Patent
Thomas et al.

(10) Patent No.: US 8,830,589 B2
(45) Date of Patent: Sep. 9, 2014

(54) TACTICAL RIFLESCOPE WITH SMARTPHONE DOCK

(71) Applicant: Cubic Corporation, San Diego, CA (US)

(72) Inventors: John O. Thomas, San Diego, CA (US); Mahyar Dadkah, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 13/781,967

(22) Filed: Mar. 1, 2013

(65) Prior Publication Data

US 2013/0229716 A1    Sep. 5, 2013

Related U.S. Application Data

(60) Provisional application No. 61/605,594, filed on Mar. 1, 2012.

(51) Int. Cl.
*G02B 27/14* (2006.01)

(52) U.S. Cl.
USPC .......................................... 359/633; 359/630

(58) Field of Classification Search
USPC .................................................. 359/619–639
See application file for complete search history.

(56) References Cited

U.S. PATENT DOCUMENTS 7,133,222 B2 * 11/2006 Chintala et al. ............... 359/811
8,442,593 B1 *  5/2013 Kwon et al. ................... 455/566

* cited by examiner

*Primary Examiner* — Mohammed Hasan
(74) *Attorney, Agent, or Firm* — Kilpatrick Townsend & Stockton LLP

(57) ABSTRACT

Techniques are disclosed for creating optical systems and devices that enable a mobile device (e.g., smartphone or other mobile phone, personal media player, and/or other personal electronic device) to be coupled with an optical device (e.g., a riflescope, spotting scope, etc.) such that information shown on the display of the mobile device is viewable to a user looking into the eyepiece of the optical device. Additionally or alternatively, an image from the optical device can be communicated to the mobile device. A modular design can utilize an apparatus configured to encase a mobile device, which can be coupled with the optical device via and optical and/or electrical interface.

18 Claims, 6 Drawing Sheets

TACTICAL RIFLESCOPE WITH SMARTPHONE DOCK

CROSS-REFERENCES TO RELATED APPLICATIONS

The present application claims benefit under 35 USC 119(e) of U.S. Provisional Application No. 61/605,594, filed on Mar. 1, 2012 of which the entire disclosure is incorporated herein by reference for all purposes.

BACKGROUND

Riflescopes and other optical devices can be configured to display information, in addition to the image of the targeted object, to a user looking into an eyepiece or viewfinder of the optical device. In the case of a laser rangefinder, for example, a distance to a target can be displayed along with an image of the target itself. Integrating a laser rangefinder and/or other components to provide such additional functionality to an optical device, however, can be challenging and provide limited functionality.

BRIEF SUMMARY

Techniques are disclosed for creating optical systems and devices that enable a mobile device (e.g., smartphone or other mobile phone, personal media player, and/or other personal electronic device) to be coupled with an optical device (e.g., a riflescope, spotting scope, etc.) such that information shown on the display of the mobile device is viewable to a user looking into the eyepiece of the optical device. Additionally or alternatively, an image from the optical device can be communicated to the mobile device. A modular design can utilize an apparatus configured to encase a mobile device, which can be coupled with the optical device via and optical and/or electrical interface.

An example apparatus for coupling a mobile device with an optical scope, according to the disclosure, includes a body configured to encase the mobile device. The body comprises an opening through which the mobile device can be inserted into the apparatus, and an optical interface configured to be coupled with the optical scope. The apparatus further includes a first optical assembly disposed at least partially within the body and coupled with the optical interface. The first optical assembly is configured to direct light from a display of the mobile device to the optical interface when the mobile device is encased within the body. A second optical assembly is disposed at least partially within the body and coupled with the optical interface. The second optical assembly is configured to direct light from the optical interface to a camera of the mobile device when the mobile device is encased within the body.

An example optical scope configured to display images from a mobile device coupled therewith, according to the disclosure, includes a body having an optical interface configured to be coupled with an apparatus encasing the mobile device, an objective lens, and an eyepiece. The optical scope also includes a first optical assembly disposed at least partially within the body and configured to direct a first portion of light entering the optical scope through the objective lens to the optical interface, and direct a second portion of light entering the optical scope through the objective lens to the eyepiece to create a first image viewable through the eyepiece. The optical scope further includes a second optical assembly disposed at least partially within the body. The second optical assembly is configured to direct light received via the optical interface to the eyepiece to create a second image viewable through the eyepiece.

An example optical system enabling a mobile device to be coupled with a scope, according to the disclosure, includes a docking apparatus with a first interface. The docking apparatus is configured to direct a first image, received from the first interface, to the mobile device when the mobile device is encased at least partially within the docking apparatus. The docking apparatus is also configured to direct a second image, received from the mobile device when the mobile device is encased at least partially within the docking apparatus, to the first interface. The optical system also includes a scope with an eyepiece, an objective lens, and a second interface configured to be communicatively coupled with the first interface. The scope is configured to receive the first image via the objective lens, and direct the first image to the second interface and the eyepiece. The scope is also configured to receive the second image via the second interface, direct the second image to the eyepiece, and display the first image and the second image via the eyepiece.

Numerous benefits are achieved by way of the present invention over conventional techniques. For example, embodiments of the present invention can enable information to be displayed on an optical device without the need to separately integrate functionality provided by a mobile device, such as orientation, location, and/or motion sensing, Internet connectivity, wireless communication, image capture, and the like. This can allow for a smaller, cheaper, and/or lighter optical device. These and other embodiments of the invention, along with many of its advantages and features, are described in more detail in conjunction with the text below and attached figures.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the spirit and scope.

Modern optical devices can provide information in an image seen through an eyepiece of the optical devices. In addition to a target on which the optical device focused, for example, the optical device can display additional information through an eyepiece or viewfinder, such as information about the target, the environment, the optical device, and the like. Providing such functionality in optical devices can be challenging and expensive, and may provide only a limited amount of additional features.

Embodiments described herein enable a mobile device (e.g., smartphone or other mobile phone, personal media player, and/or other personal electronic device) to be coupled with an optical scope (e.g., a riflescope, spotting scope, etc.) such that information shown on the display of the mobile device is viewable to a user looking into the eyepiece of the optical device. Because modern mobile devices such as smartphones have powerful processing capabilities, numerous sensors, wireless communication capabilities, and more, they can provide functionality far beyond the functionality of typical optical devices. For example, when a military riflescope is coupled with a soldier's smartphone, in can effectively create a "smart scope," capable of processing and/or providing information to the soldier in a vast number of ways, which can be determined by one or more applications executed by the smartphone.

Figure 1A:
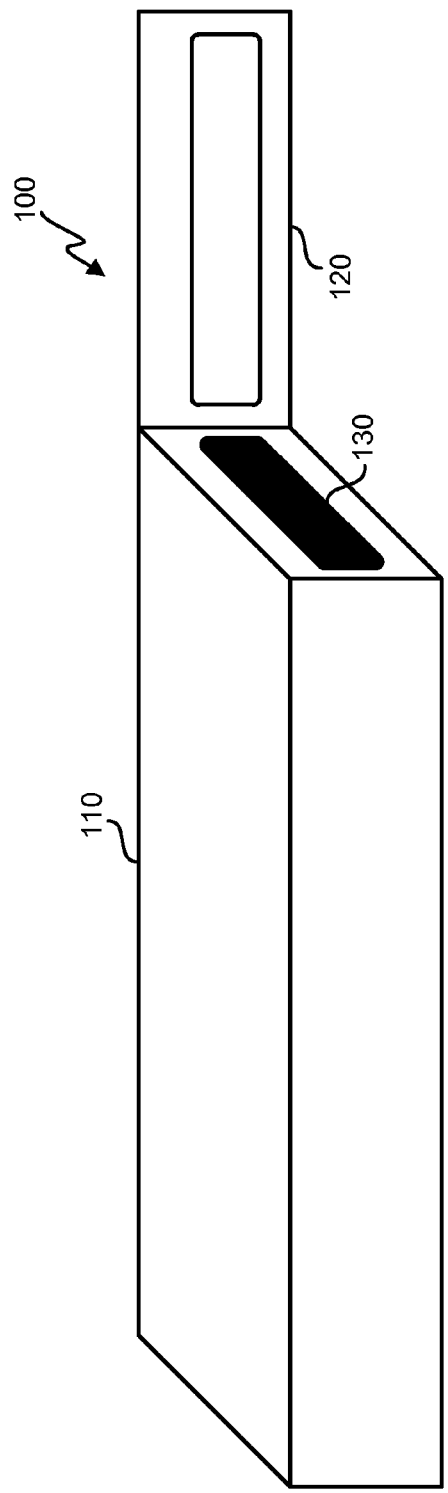
FIGS. 1A-1B are simplified illustrations showing a docking apparatus configured to couple a smartphone with an optical scope, according to one embodiment.
Figure 1B:
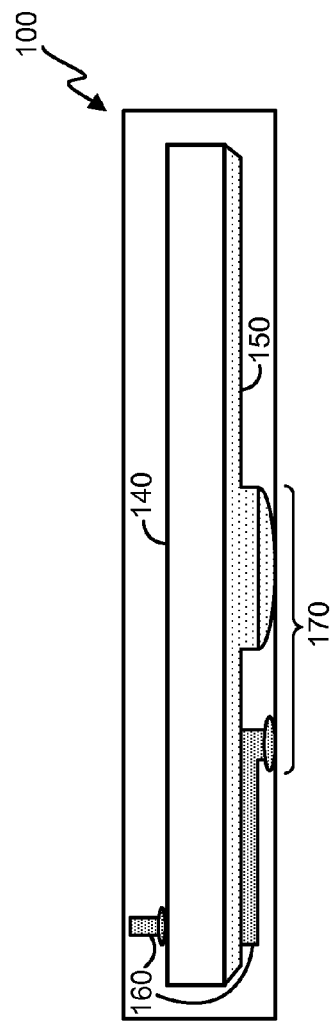

FIGS. 1A-1B are simplified images showing a docking apparatus 100 configured to couple a smartphone with an optical scope, according to one embodiment. FIG. 1A is a plan view of the docking apparatus 100, which can include a body 110 providing an environmentally-sealed case in which the smartphone 140 (not shown) is inserted. Although the embodiment shown in FIG. 1A illustrates a hinged door 120 configured to close an opening 130 through which the smartphone 140 may be inserted, embodiments of a docking apparatus 100 can include any of a variety of structures for allowing a smartphone 140 to be inserted into the docking apparatus 100 and/or sealing the smartphone 140 inside the docking apparatus 100. It will be understood that FIGS. 1A and 1B, as with other figures described herein, provide examples of a docking apparatus 100 for coupling a smartphone 140 with an optical scope. However, embodiments are not so limited. Other embodiments can include other structure types and may enable the coupling of any of a variety of mobile devices with any of a variety of optical devices.

FIG. 1B illustrates a cross-sectional view of the docking apparatus 100 with a smartphone 140 inserted, showing internal components of the docking apparatus 100. These components can include a first optical assembly 150 configured to direct light from the smartphone's display to an optical interface 170, and/or a second optical assembly 160 configured to direct light from the optical interface 170 to a the smartphone's camera. The optical assemblies can utilize any of a variety of optical elements in order to properly direct light, such as waveguides, lenses, prisms, mirrors, and the like, and may be disposed, at least partially, within the body 110 of the docking apparatus 100. Although the optical assemblies 150, 160 shown in FIGS. 1A and 1B as accommodating a smartphone 140 with a back-facing camera (i.e., a camera on the opposite side of the smartphone 140 as the display), the optical assemblies 150, 160 can accommodate various configurations (e.g., front-facing camera, stereoscopic cameras, etc.)

In military applications, a standard docking apparatus 100 may be utilized if soldiers are issued a common type of smartphone 140. However, because different types of smartphones 140 (and other mobile devices) have different features (e.g., display size, camera location, physical dimensions, and the like), different docking apparatuses 100 can be customized to a particular type of smartphone 140. However, a standard optical interface 170 can be used such that a docking apparatus for any type of smartphone can be coupled with an optical scope with little or no adjustment.

Figure 2:
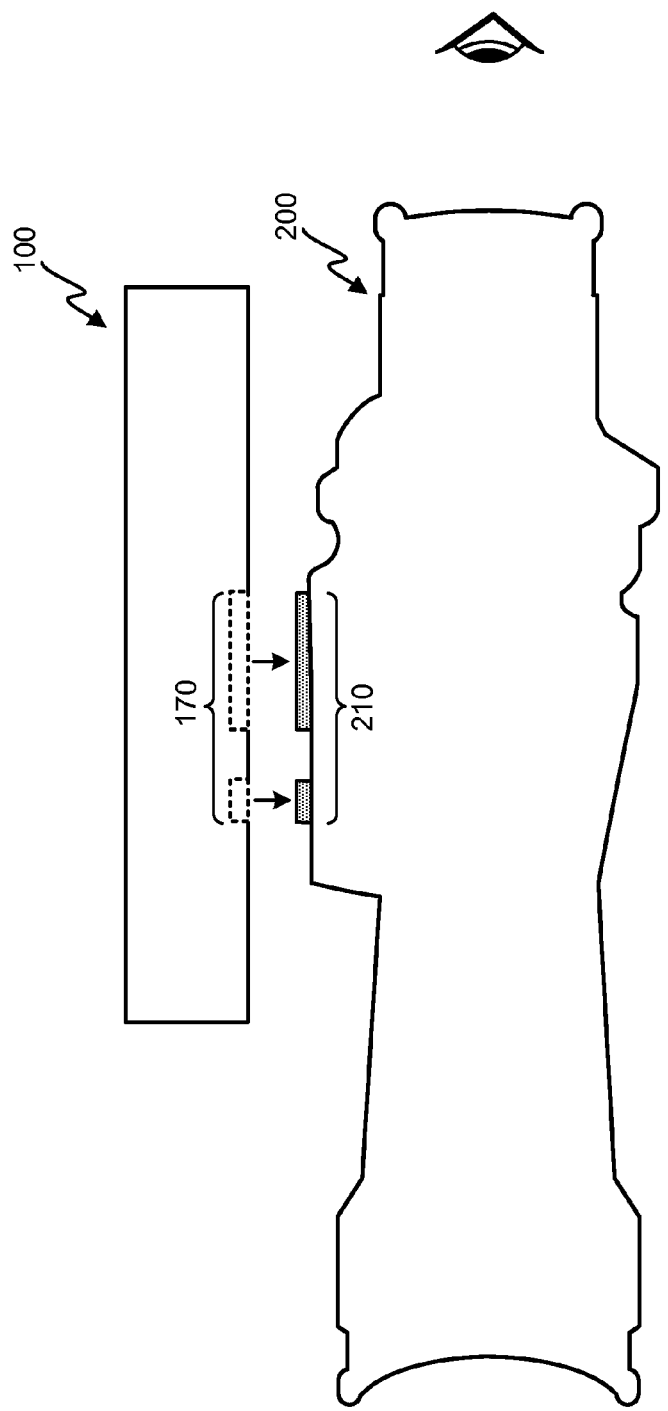
FIG. 2 is a silhouette illustration showing how a docking apparatus can be coupled with an optical scope, according to one embodiment.

FIG. 2 is a silhouette illustration showing how a docking apparatus 100 can be coupled with an optical scope 200. Here, the optical interface 170 of the docking apparatus 100 corresponds with a scope interface 210 through which light can be exchanged between the docking apparatus 100 and the optical scope 200. Moreover, the docking apparatus 100 and optical scope 200 can include physical features to help enable and/or secure their coupling. For example, as illustrated, the optical interface 170 of the docking apparatus 100 can be recessed, and the scope interface can correspondingly protrude to help align and secure the docking apparatus 100 and optical scope 200 when coupled. Additionally or alternatively, embodiments may include any of a variety of securing elements, such as one or more clips, straps, buckles, etc., located on the docking apparatus 100 and/or the optical scope 200, to help physically secure the docking apparatus 100 to the optical scope 200.

Figure 3:
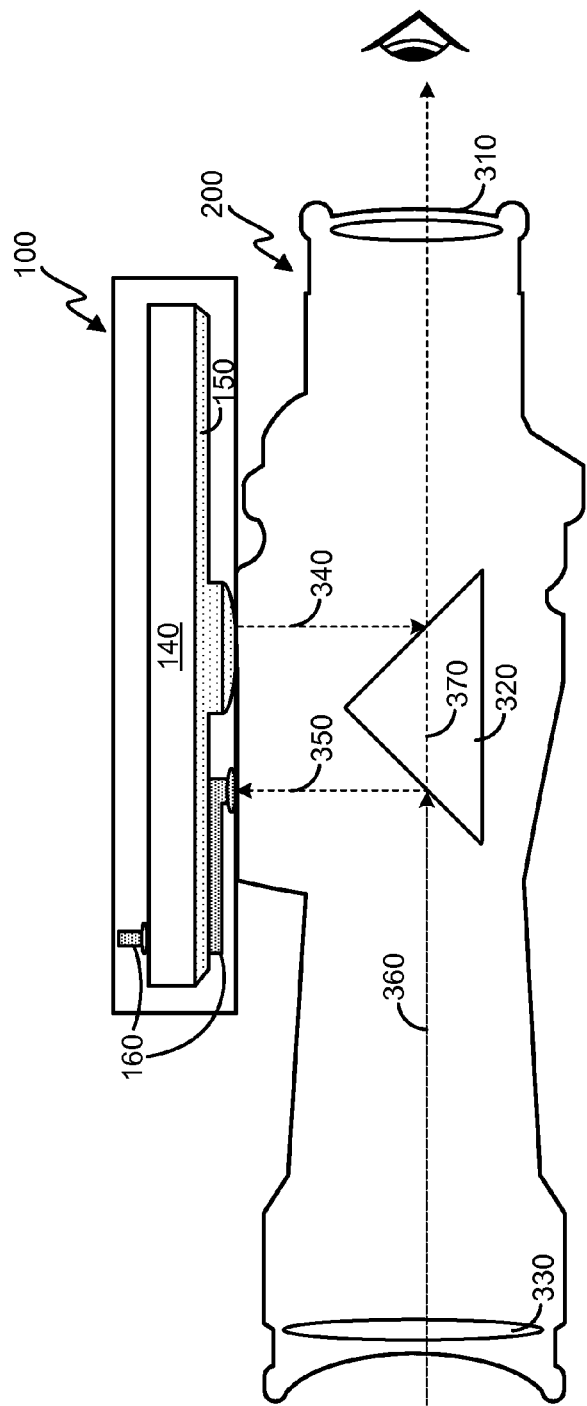
FIG. 3 is a simplified cross-sectional illustration showing basic functionality of a docking apparatus and an optical scope when coupled, according to one embodiment.

FIG. 3 is a simplified cross-sectional illustration showing basic functionality of the docking apparatus 100 and the optical scope 200 when coupled. It will be understood that FIG. 3 is a simplified drawing showing only basic components of the docking apparatus 100 and the optical scope 200. Embodiments may include a variety of optical elements and/or assemblies, which are not shown, to perform the functionality described herein. To avoid clutter, the optical interface 170 and the scope interface 210 are not labeled. However, it will be understood that, as indicated in FIG. 2, these interfaces are disposed at the location in which light 350, 340 is exchanged between the optical scope 200 and docking apparatus 100.

In the illustrated embodiment shown in FIG. 3, incoming light 360 enters the optical scope 200 via an objective lens to provide a first image (e.g., of a target). In various embodiments, the objective lens 330 can include a single lens, a compound lens, mirror, and/or a combination of several optical elements. Moreover, the objective lens 330 can have physical attributes, such as focal length, diameter, material composition, etc. to help provide the desired specifications of the optical scope 200, such as a particular magnification and/or field of view. According to one embodiment, the objective lens has a clear aperture of 32 mm. Other embodiments can include larger or smaller apertures, depending on desired functionality. For example, embodiments can include aperture diameters of 25 mm or smaller, 35 mm, 38 mm, 50 mm, 63 mm, 80 mm, or 100 mm or larger.

After passing through the objective lens 330, the incoming light 360 is guided toward an image routing assembly 320. The image routing assembly 320 is configured to route the image from the incoming light 360 to both the eyepiece 310 and the scope interface 210. Depending on the desired functionality, the image routing assembly can include any of a variety of optical elements such as a prism, mirror (wholly or partly reflective) and/or reflective coating, image erector, and the like. The portion 350 of the incoming light 360 routed to the scope interface is provided to the optical interface of the docking apparatus 100, enabling the second optical assembly 160 to route the first image to the camera of the smartphone 140. The portion 370 of the incoming light 360 routed to the eyepiece 310 enables the first image to be seen by a viewer looking into the eyepiece.

The image routing assembly 320 is additionally configured to route light 340 received via the scope interface 210 to the eyepiece 310 such that a second image is viewable via the eyepiece. Here, the second image is generated by the smartphone 140 and shown on at least a part of the mobile device's display.

Thus, a viewer looking into the eyepiece 310 can see both first and second images. That is, an image received via the objective lens 330 and an image shown on the display of the smartphone 140. Similar to the objective lens 330, the eyepiece 310 can include a single lens, a compound lens, mirror, and/or a combination of several optical elements. Additionally, the eyepiece 310 can have physical attributes, such as focal length, diameter, material composition, etc. to help provide the desired specifications of the optical scope 200, such as a particular magnification and/or field of view.

Although the embodiments illustrated in FIGS. 1B-3 utilize optical assemblies and interfaces to route images (e.g., to an eyepiece and/or camera) using optical signals (e.g., light conveying the images), other embodiments may additionally or alternatively utilize electrical and/or wireless signals. For example, rather than causing a mobile device to show images on its display, embodiments may utilize an electrical, optical, electro-optical, and/or radio frequency (RF) interface by which images are transferred digitally. A docking apparatus 100 can include a Universal Serial Bus (USB) connector or other electrical interface, for example, to route electrical signals from a smartphone (or other mobile device) to the optical scope. The optical scope can have an internal display configured to show an image, based on the electrical signals, which is routed to (and viewable via) the eyepiece. A person having ordinary skill in the art will recognize many substitutions, omissions, and/or other variations.

Additionally or alternatively, embodiments of a docking apparatus 100 may provide a user interface, such as a touchpad, buttons, dials, switches, and the like, which can connect with the mobile device via an electrical and/or wireless connection. This can enable a user to provide input to a mobile device while the mobile device is encased within the docking apparatus.

Coupling a smartphone 140 or other mobile device with an optical scope 200 using the techniques provided herein offers many beneficial features. For one, it allows through-sight information to be presented to a user by showing an image from the smartphone 140 together with an image captured by the optical scope 200. This allows a user of the optical scope 200 to access any of a wide variety of information from the smartphone 140 while looking through the optical scope 200. The smartphone 140 can access GPS, orientation information, an image received from the optical scope 200, and/or other information to determine where the optical scope is pointed and/or what may be in the optical scope's view.

Using cellular and/or other wireless technologies, the smartphone 140 can communicate with remote systems via one or more data communication networks (including the Internet), a tactical radio, and the like, to access information that may not be locally available and/or provide information to remote systems. The smartphone 140 can utilize one or more software applications to provide this functionality. For example, embodiments may enable a smartphone 140 to transmit images (e.g., still, video, etc.) received from the optical scope 200 to a remote computer or other system for recordation and/or analysis.

The ability of the smartphone 140 to provide information to a user, including information received from one or more remote systems, enables the optical scope 200 to be used for a wide number of applications. For example, images from the optical scope 200 can be analyzed (as well as other information, such as orientation, location, etc.), by accessing information stored in a local and/or remote database, to provide augmented reality functionality to the optical scope 200. This can allow the optical scope to display information to a user regarding an image captured by the optical scope 200. For example, embodiments can enable a user to point the scope toward a target (person, building, geographical feature, etc.) and receive information regarding the target. This information can include identification, such as a person's name, building type (e.g., hospital, church, etc.). The information can further include a friend or enemy status, warnings (e.g., a target building with known toxic chemicals, a target will be subject to an imminent air strike, etc.), and/or other information regarding one or more objects within the image and/or nearby (e.g., nearby power supply, water source, known allies in the area (e.g., information from Blue Force Tracking).

Figure 4A:
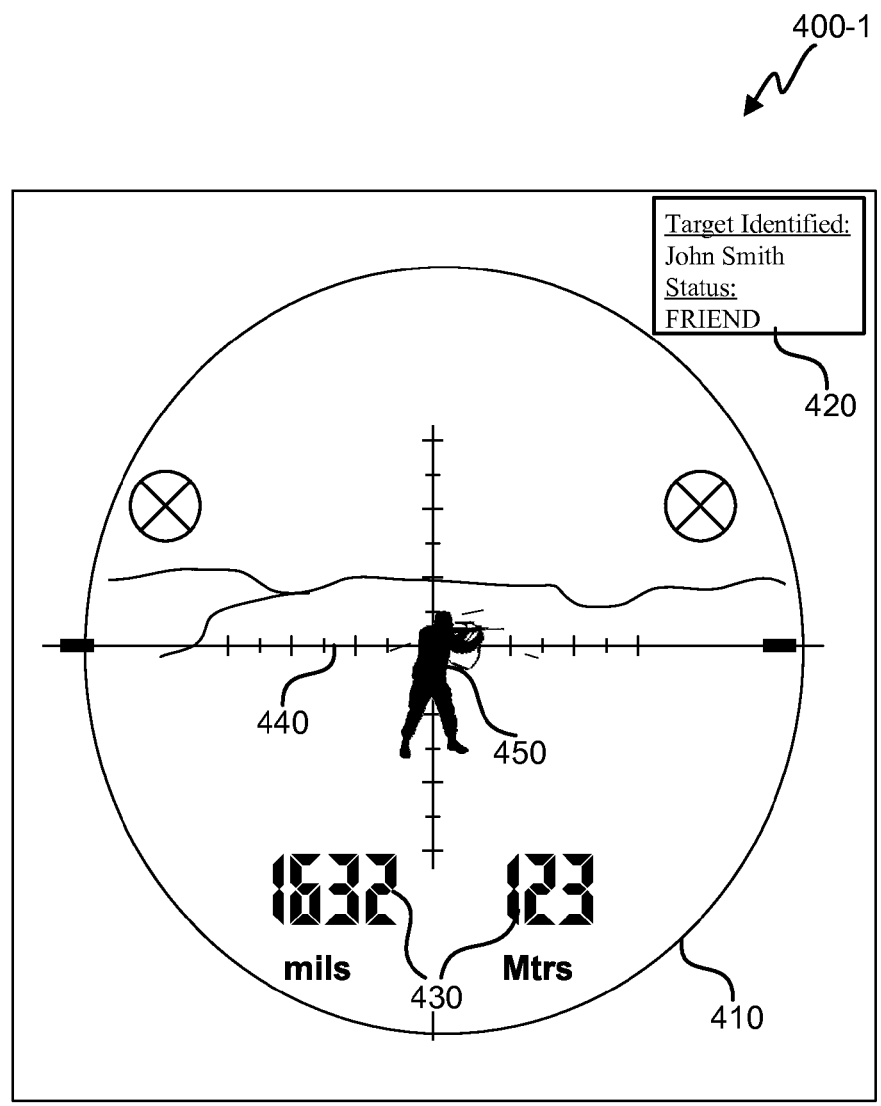
FIGS. 4A-4B are illustrations showing embodiments of a view to a user looking through the eyepiece of an optical scope when coupled with a mobile device.
Figure 4B:
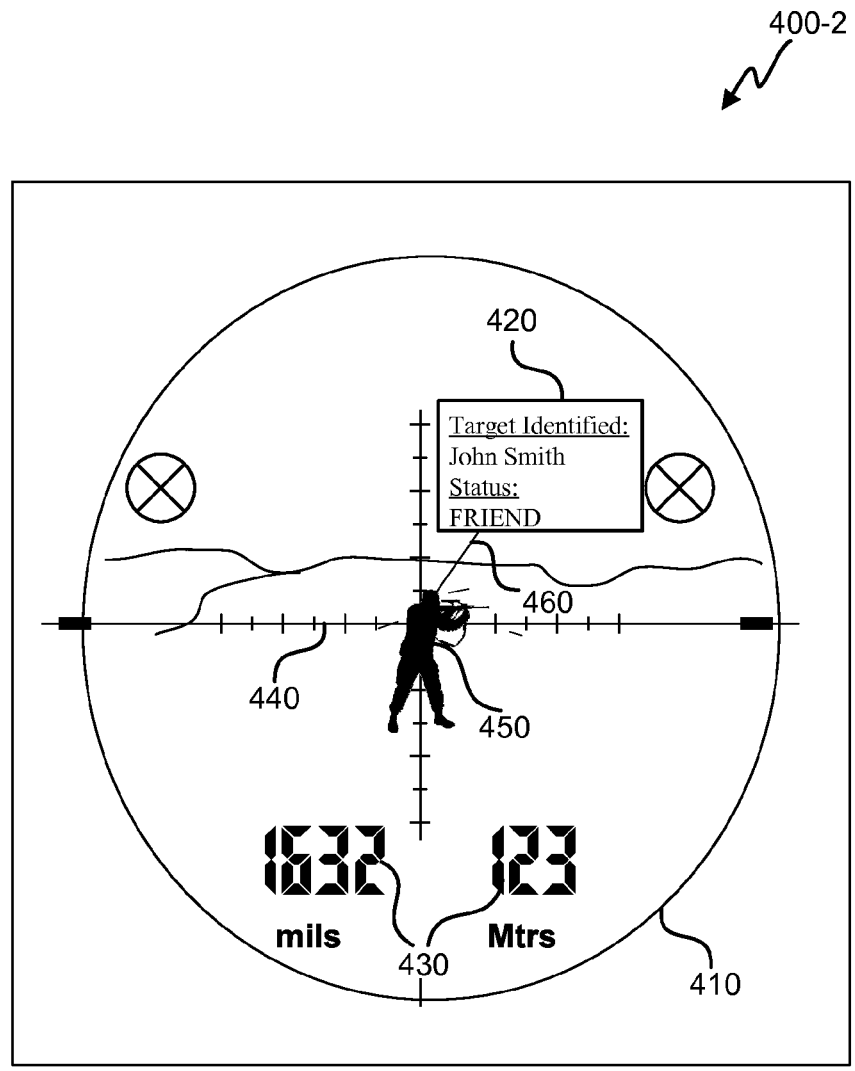

FIGS. 4A-4B are illustrations showing the view 400 to a user looking through the eyepiece 310 of an optical scope 200 when coupled with a smartphone 140 or other mobile device in accordance with the techniques described above, according to different embodiments. A first view 400-1, shown in FIG. 4A, includes a first image 410 of a target 450 captured by the optical scope 200 and a second image 420 originating from the smartphone 140 coupled to the optical scope 200. Here, the second image 420 is spatially separate from the first image. In some embodiments, as shown in FIG. 4A, additional information and/or features can be overlaid on the first image 410, such as information from a rangefinder 430 (e.g., field of view, distance to a target, etc.), crosshairs 440, and the like. This additional information and/or features may be generated separate from the mobile device. For example, they may be generated by a rangefinder coupled to and/or embedded within the optical scope 200. In other embodiments, a rangefinder may be coupled to and/or integrated with the smartphone 140, in which case the information from the rangefinder 430 may be displayed in the second image 420 generated by the smartphone.

FIG. 4B shows a second view 400-2, similar to the first view 400-1 of FIG. 4A. Here, however, the second image 420 is overlaid on the first image 410. In other embodiments, the second image may be only partially overlaid on the first image 410. The placement of the second image 420 relative to the first image can be dictated by any of a variety of factors, including the one or more optical assemblies involved in routing the image from the smartphone 140 to the eyepiece 310, the smartphone 140 itself (e.g., an application on the smartphone 140 that determines where to place the second image 420), and/or other factors. Placement of the second image 420 spatially separate from the first image 410, as shown in FIG. 4A, can be beneficial in scenarios in which the first image 410 is substantially bright (e.g., in daylight conditions), making the second image 420 difficult to see, given the relatively low brightness of the smartphone's display compared with the bright first image 410. On the other hand, where the first image 410 is less bright, the second image 420 can be easily viewed when overlaid, at least in part, on the first image 410. In some embodiments, the smartphone can be configured to (e.g., execute an application providing the functionality to) determine a brightness of the first image 410

(e.g., by analyzing the first image routed to the smartphone's camera, determining a location and/or time of day, utilizing light and/or other sensors, etc.) and place the second image 420 relative to the first image 410 based on the determined brightness of the first image.

As discussed previously, information provided in the second image 420 (by the smartphone 140) can include any of a variety of data, depending on desired functionality. For a weapon-mounted combat scope, for example, this information can include identification of a target (which can be determined, for example, by comparing biological and/or other features of a target with a database of features local to and/or remote from the smartphone 140), friend-or-foe status, a range or distance to a target and/or other information about a target, a field of view, a battery-level, as well as indicators of elevation, azimuth, altitude, bearing, elevation, bearing, position coordinates, horizon indicator, date, time, and the like.

In addition or as an alternative to brightness, other factors can dictate where a smartphone 140 chooses to display the second image 420 on the first image, such as location of one or more targets 450 within the first image 410. Using image processing, the smartphone 140 can determine, for example, a nearby location having less information of interest (e.g., a wall, the sky, and/or other object having substantially uniform texture, coloring, etc.) and overlay that nearby location with the second image 420. The smartphone may also display a line 460 or other visual indicator connecting the second image 420 to the item to which the information in the second image 420 pertains. Although a single second image 420 is shown in FIGS. 4A-4B, scenarios may arise in which the smartphone 140 causes multiple images to be displayed to a user, any or all of which may be at least partially overlaid on the first image 410. Such scenarios can arise when multiple targets, items of interest, and/or other features identifiable by the smartphone 140 are shown in the first image 410.

Figure 5:
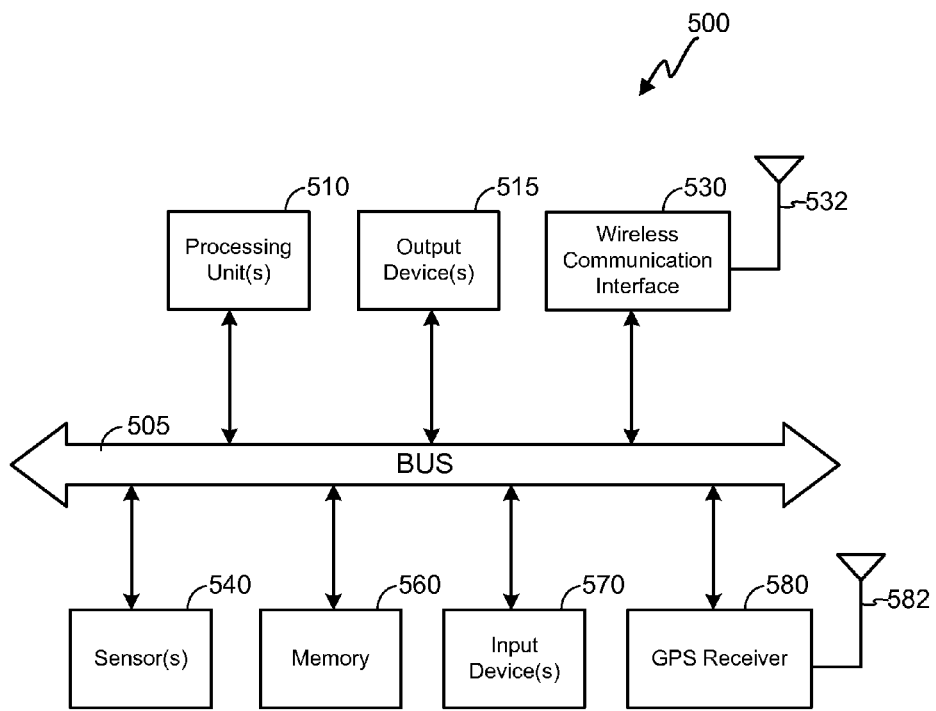
FIG. 5 is a block diagram of an embodiment of a mobile device, which can be coupled with an optical scope using the techniques provided herein.

FIG. 5 illustrates an embodiment of a mobile device 500, which can be coupled with an optical scope using the techniques provided herein. A mobile device can include, for example, the smartphone 140 described above in relation to FIGS. 1A-4B. As discussed above, the mobile device 500 can utilize any combination of software and/or hardware to provide image capture and processing, image display, wireless communication, and/or other functionality as described above. It should be noted that FIG. 5 is meant only to provide a generalized illustration of various components, any or all of which may be utilized as appropriate. Moreover, system elements may be implemented in a relatively separated or relatively more integrated manner.

The mobile device 500 is shown comprising hardware and/or software elements that can be electrically coupled via a bus 505, or may otherwise be in communication, as appropriate. The hardware elements may include a processing unit(s) 510 which can include without limitation one or more general-purpose processors, one or more special-purpose processors (such as digital signal processors (DSPs), graphics acceleration processors, application specific integrated circuits (ASICs), and/or the like), and/or other processing structure or means, which can be configured to perform one or more of the methods described herein. The mobile device 500 also can include one or more input devices 570, which can include without limitation a touch screen, a touch pad, microphone, button(s), dial(s), switch(es), and/or the like; and one or more output devices 515, which can include without limitation a display, light emitting diode (LED), speakers, and/or the like.

The mobile device 500 might also include a wireless communication interface 530, which can include without limitation a modem, a network card, an infrared communication device, a wireless communication device, and/or a chipset (such as a Bluetooth™ device, an IEEE 502.11 device, an IEEE 502.15.4 device, a WiFi device, a WiMax device, cellular communication facilities, etc.), and/or the like. The wireless communication interface 530 may permit data to be exchanged with a network, tactical radio, optical scope, and/or any other electronic devices described herein. The communication can be carried out via one or more wireless communication antenna(s) 532 that send and/or receive wireless signals.

The mobile device 500 can further include sensor(s) 540. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 540 can be utilized, among other things, for speed, velocity, orientation, and location determinations. Even so, techniques provided herein can utilize mobile devices with few or no sensor(s) 540, which may limit the functionality of such embodiments.

Embodiments of the mobile device 500 may also include a Global Positioning System (GPS) receiver 580 (and/or other positioning receiver) capable of receiving signals from one or more satellites using a receiver antenna 582. Such positioning can be utilized to complement and/or incorporate the techniques described herein.

The mobile device 500 may further include and/or be in communication with a memory 560. The memory 560 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data structures, such as one or more local databases as described herein, and may be allocated by hardware and/or software elements of the mobile device 500. Additionally or alternatively, data structures described herein can be implemented by a cache or other local memory of the processing unit(s) 510.

The memory 560 of the mobile device 500 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures and/or features described above might be implemented as code and/or instructions executable by the mobile device 500 (and/or the processing unit(s) 510 of a mobile device 500) and/or stored on a non-transitory and/or machine-readable storage medium (e.g., a "computer-readable storage medium," a "process-readable storage medium, etc.). In an aspect, then, such code and/or instructions can be used to configure and/or adapt a general purpose processor (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Furthermore, various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation. Features described with respect to certain configurations may be combined in various other configurations. Different aspects and elements of the configurations may be combined in a similar manner. Also, technology evolves and, thus, many of the elements are examples and do not limit the scope of the disclosure or claims.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

What is claimed is:

1. An apparatus for coupling a mobile device with an optical scope, the apparatus comprising:
   a body configured to encase the mobile device, wherein the body comprises:
      an opening through which the mobile device can be inserted into the apparatus; and
      an optical interface configured to be communicatively coupled with a scope interface to exchange light between the apparatus and the optical scope;
   a first optical assembly disposed at least partially within the body and coupled with the optical interface, wherein the first optical assembly is configured to direct light from a display of the mobile device to the optical interface when the mobile device is encased within the body; and
   a second optical assembly disposed at least partially within the body and coupled with the optical interface, wherein the second optical assembly is configured to direct light from the optical interface to a camera of the mobile device when the mobile device is encased within the body.

2. The apparatus for coupling the mobile device with the optical scope as recited in claim 1, wherein either or both of the first optical assembly and the second optical assembly includes a waveguide.

3. The apparatus for coupling the mobile device with the optical scope as recited in claim 1, further comprising a securing element configured to secure the apparatus to the optical scope.

4. The apparatus for coupling the mobile device with the optical scope as recited in claim 1, further comprising a user interface configured to provide user input to the mobile device when the mobile device is encased within the body.

5. An optical scope configured to display images from a mobile device coupled therewith, the optical scope comprising:
   a body having:
      a scope interface configured to be coupled with an apparatus encasing the mobile device;
      an objective lens; and
      an eyepiece; and
   an image routing assembly disposed at least partially within the body and configured to:
      direct a first portion of light entering the optical scope through the objective lens to the scope interface; and
      direct a second portion of light entering the optical scope through the objective lens to the eyepiece to create a first image viewable through the eyepiece; and
      direct light received via the scope interface to the eyepiece to create a second image viewable through the eyepiece.

6. The optical scope configured to display images from the mobile device coupled therewith, as recited in claim 5, wherein the image routing assembly includes a prism.

7. The optical scope configured to display images from the mobile device coupled therewith, as recited in claim 5, wherein the image routing assembly is configured such that the second image is spatially separate from the first image when viewed from through the eyepiece.

8. The optical scope configured to display images from the mobile device coupled therewith, as recited in claim 5, wherein the image routing assembly is configured such that at least a portion of the second image is overlaid on at least a portion of the first image when viewed from through the eyepiece.

9. The optical scope configured to display images from the mobile device coupled therewith, as recited in claim 5, further configured to display information from a rangefinder via the eyepiece.

10. The optical scope configured to display images from the mobile device coupled therewith, as recited in claim 9, wherein the rangefinder is imbedded within the optical scope.

11. An optical system enabling a mobile device to be coupled with a scope, the optical system comprising:
   a docking apparatus having a first interface, wherein the docking apparatus is configured to:
      direct a first image, received from the first interface, to the mobile device when the mobile device is encased at least partially within the docking apparatus; and
      direct a second image, received from the mobile device when the mobile device is encased at least partially within the docking apparatus, to the first interface; and
   the scope having:
      an eyepiece;
      an objective lens; and
      a second interface configured to be communicatively coupled with the first interface;

wherein the scope is configured to:
  receive the first image via the objective lens;
  direct the first image to:
    the second interface, and
    the eyepiece;
  receive the second image via the second interface;
  direct the second image to the eyepiece; and
  display the first image and the second image via the eyepiece.

12. The optical system enabling the mobile device to be coupled with the scope, as recited in claim 11, wherein the first interface and the second interface are configured to communicate either or both the first image and the second image using electrical signals.

13. The optical system enabling the mobile device to be coupled with the scope, as recited in claim 11, wherein:
  the first interface is configured to communicate the second image using electrical signals;
  the scope includes a display configured to display the second image based on the electrical signals, and
  the scope is configured to direct the second image to the eyepiece by routing light form the display to the eyepiece.

14. The optical system enabling the mobile device to be coupled with the scope, as recited in claim 11, wherein the docking apparatus is configured to direct the second image to the first interface using optical signals.

15. The optical system enabling the mobile device to be coupled with the scope, as recited in claim 11, further comprising a securing element configured to physically secure the docking apparatus to the scope.

16. The optical system enabling the mobile device to be coupled with the scope, as recited in claim 11, wherein the scope is configured to display the first image and the second image via the eyepiece such that the second image is distinct from the first image when viewed from through the eyepiece.

17. The optical system enabling the mobile device to be coupled with the scope, as recited in claim 11, wherein the scope is configured to display the first image and the second image via the eyepiece such that at least a portion of the second image is overlaid on at least a portion of the first image when viewed from through the eyepiece.

18. The optical system enabling the mobile device to be coupled with the scope, as recited in claim 11, wherein the docking apparatus further comprises a user interface configured to provide user input to the mobile device when the mobile device is encased within the docking apparatus.

* * * * *